US012224147B2

(12) United States Patent
Wang et al.

(10) Patent No.: US 12,224,147 B2
(45) Date of Patent: *Feb. 11, 2025

(54) BREAKER AND CONTACTOR

(71) Applicant: SCHNEIDER ELECTRIC INDUSTRIES SAS, Rueil-Malmaison (FR)

(72) Inventors: Yuanzhong Wang, Shanghai (CN); Jiaren Xiao, Shanghai (CN); Xuedong Xia, Shanghai (CN); Francois Chaudot, Rueil-Malmaison (FR); Omer Karaagac, Rueil-Malmaison (FR); Jean-Paul Gonnet, Rueil-Malmaison (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 149 days.

This patent is subject to a terminal disclaimer.

(21) Appl. No.: 17/788,919

(22) PCT Filed: Dec. 24, 2020

(86) PCT No.: PCT/CN2020/139017

§ 371 (c)(1),
(2) Date: Jun. 24, 2022

(87) PCT Pub. No.: WO2021/129741

PCT Pub. Date: Jul. 1, 2021

(65) Prior Publication Data

US 2023/0030575 A1 Feb. 2, 2023

(30) Foreign Application Priority Data

Dec. 24, 2019 (CN) ........................ 201922351222.9

(51) Int. Cl.
*H01H 9/34* (2006.01)
*H01H 50/60* (2006.01)
*H01H 73/18* (2006.01)

(52) U.S. Cl.
CPC .............. *H01H 9/34* (2013.01); *H01H 50/60* (2013.01); *H01H 73/18* (2013.01)

(58) Field of Classification Search
CPC ............ H01H 9/34; H01H 9/443; H01H 9/46; H01H 9/345; H01H 9/346; H01H 9/36;
(Continued)

(56) References Cited

U.S. PATENT DOCUMENTS 6,064,024 A * 5/2000 Moldovan .............. H01H 9/443 335/201
6,703,575 B1 3/2004 Yamamoto
(Continued)

FOREIGN PATENT DOCUMENTS

CN 2200224 Y 6/1995
CN 2415444 Y 1/2001
(Continued)

OTHER PUBLICATIONS

Translation of FR2999790 (Original document published Jun. 20, 2014) (Year: 2014).*
(Continued)

*Primary Examiner* — William A Bolton
(74) *Attorney, Agent, or Firm* — Troutman Pepper Locke

(57) ABSTRACT

A breaker is provided including: a first stationary contact having a first stationary contact portion; a movable contact having a first movable contact portion; an actuating member to actuate the movable contact; a first arc extinguishing device; a first arc running piece extending from a first arc running end portion arranged adjacent to the first stationary contact portion to a second arc running end portion through
(Continued)

the first arc extinguishing device; and an arc guiding piece having a first arc guiding section extending in the first direction, the first arc guiding section being arranged between the movable contact and the first arc extinguishing device in a second direction perpendicular to the first direction. The second arc running end portion and the first arc guiding section are arranged at opposite sides of the first arc extinguishing device in the second direction. A contactor including the breaker is further provided.

16 Claims, 2 Drawing Sheets

(58) Field of Classification Search
CPC .. H01H 9/362; H01H 2009/365; H01H 50/60; H01H 50/546; H01H 50/54; H01H 1/20; H01H 73/18; H01H 71/0228; H01H 71/0235; H01H 9/08; H01H 1/14; H01H 1/58
USPC .. 218/1, 4, 5, 22–24, 26, 30–31, 34, 36, 38, 218/40, 155, 156, 158
See application file for complete search history.

(56) References Cited

U.S. PATENT DOCUMENTS

| | | | | |
|---|---|---|---|---|
| 7,148,774 | B1 * | 12/2006 | Shea | H01H 73/04 335/147 |
| 7,285,742 | B2 * | 10/2007 | Kinzler | H01H 71/0207 335/201 |
| 8,502,102 | B2 | 8/2013 | Eriksson et al. | |
| 9,208,977 | B2 | 12/2015 | Lang et al. | |
| 9,218,918 | B2 * | 12/2015 | Lauraire | H01H 1/2016 |
| 9,583,292 | B2 * | 2/2017 | Larcher | H01H 50/545 |
| 9,659,726 | B2 * | 5/2017 | Steinbauer | H01H 9/346 |
| 10,192,700 | B2 * | 1/2019 | Rival | H01H 33/10 |
| 10,290,451 | B2 * | 5/2019 | Grumel | H01H 71/025 |
| 10,361,042 | B2 | 7/2019 | Comtois | |
| 2011/0133870 | A1 * | 6/2011 | Annis | H01H 9/446 335/205 |
| 2014/0262708 | A1 * | 9/2014 | Lauraire | H01H 1/2016 200/243 |
| 2019/0333721 | A1 | 10/2019 | Tian et al. | |

FOREIGN PATENT DOCUMENTS

| | | | | |
|---|---|---|---|---|
| CN | 103311063 A | | 9/2013 | |
| CN | 204348662 U | | 5/2015 | |
| CN | 205645612 U | | 10/2016 | |
| CN | 208240528 U | | 12/2018 | |
| CN | 109285704 A | | 1/2019 | |
| CN | 210897140 U | | 6/2020 | |
| CN | 210956485 U | | 7/2020 | |
| FR | 2999790 A1 | * | 6/2014 | H01H 9/342 |
| JP | 2018160359 A | | 10/2018 | |

OTHER PUBLICATIONS

International Search Report dated Mar. 24, 2021 for corresponding International Patent Application No. PCT/CN2020/139017, 7 pages.

* cited by examiner

BREAKER AND CONTACTOR

CROSS-REFERENCE TO RELATED APPLICATIONS

The present application claims priority of China Patent application No. CN201922351222.9 filed on Dec. 24, 2019.

TECHNICAL FIELD

The present disclosure relates to a breaker.

BACKGROUND

Breaker is an important component in a contactor and the like, the breaker includes a movable contact and a stationary contact, the movable contact moves to contact and disconnect with the stationary contact to control the on and off of a circuit.

Upon the movable contact and the stationary contact being disconnected, an electric arc may be generated, and a device for guiding and extinguishing the electric arc needs to be provided. Further, it is needed to optimize the position, shape and orientation of these devices to improve the arc extinguishing performance.

SUMMARY

Embodiments of the present disclosure provide a breaker, which includes: a first stationary contact, including a first stationary contact portion; a movable contact, including a first movable contact portion; an actuating member, connected to the movable contact to actuate the movable contact to move in a first direction between an open position and a closed position, at the open position, the first movable contact portion being spaced apart from the first stationary contact portion, at the closed portion, the first movable contact portion being in contact with the first stationary contact portion; a first arc extinguishing device, including a plurality of arc extinguishing grid sheets; a first arc running piece, extending from a first arc running end portion of the first arc running piece arranged adjacent to the first stationary contact portion through the first arc extinguishing device to a second arc running end portion of the first arc running piece, to guide an electric arc from the first stationary contact to the first arc extinguishing device; and an arc guiding piece including a first arc guiding section extending in the first direction, the first arc guiding section being arranged between the movable contact and the first arc extinguishing device in a second direction perpendicular to the first direction, to guide an electric arc from the movable contact to the first arc extinguishing device. The second arc running end portion of the first arc running piece and the first arc guiding section are arranged at opposite sides of the first arc extinguishing device in the second direction.

For example, in some embodiments, the breaker further includes: a housing, completely accommodating the movable contact, the first arc extinguishing device, the first arc running piece and the arc guiding piece, and accommodating at least a part of the actuating member and the first stationary contact. The actuating member extends to an outside of the housing in the first direction, the first stationary contact extends to the outside of the housing in the second direction.

For example, in some embodiments, the plurality of arc extinguishing grid sheets are spaced apart in the second direction, and extend into sheets in the first direction and a third direction, the third direction being perpendicular to the first direction and the second direction. Each of the arc extinguishing grid sheets is provided with a notch. The first arc running piece extends from the first arc running end portion to the second arc running end portion and extends away from the first stationary contact portion in both the first direction and the second direction, and the first arc running piece extends through notches of the plurality of arc extinguishing grid sheets.

For example, in some embodiments, the first arc running piece is rounded L-shaped.

For example, in some embodiments, the first arc running end portion is welded to a free end of the first stationary contact close to the first stationary contact portion.

For example, in some embodiments, the first movable contact portion and the first stationary contact portion are both flat surfaces, and a distance between the first arc running piece and the arc guiding piece is the shortest in the first direction. In the first direction, the distance between the first arc running piece and the arc guiding piece is approximately equal to a distance between the first movable contact portion and the first stationary contact portion upon the movable contact being at the open position.

For example, in some embodiments, in the second direction, a shortest distance between the movable contact and the first arc guiding section is approximately equal to a shortest distance between the first arc guiding section and the arc extinguishing grid sheets.

For example, in some embodiments, the first movable contact portion is a flat surface. Upon the movable contact being at the open position, the first movable contact portion is closer to the first stationary contact than the arc guiding piece in the first direction, and upon the movable contact being at the open position, a shortest distance between the first movable contact portion and the arc guiding piece in the first direction is approximately equal to a shortest distance between the movable contact and the first arc guiding section in the second direction.

For example, in some embodiments, the first stationary contact includes a first parallel section, a second parallel section, and a contact curved section connecting the first parallel section and the second parallel section. The first parallel section extends in the housing in the second direction, and the second parallel section extends out of the housing in the second direction. The first stationary contact portion is arranged on the first parallel section of the first stationary contact.

For example, in some embodiments, the breaker further includes a first magnetic resistance piece. The first magnetic resistance piece is positioned between the first parallel section and the second parallel section of the first stationary contact in the first direction. The first magnetic resistance piece extends in the second direction and is spaced apart from the first parallel section by a distance of less than 0.5 mm in the first direction.

For example, in some embodiments, the breaker further includes: a second stationary contact, including a second stationary contact portion; a second arc extinguishing device; and a second arc running piece configured to guide an electric arc from the second stationary contact to the second arc extinguishing device. The movable contact further includes a second movable contact portion, at the open position, the second movable contact portion being spaced apart from the second stationary contact portion, and at the closed position, the second movable contact portion being in contact with the second stationary contact portion contact. The arc guiding piece further includes a second arc guiding section extending in the first direction, the second arc guiding section being configured to guide an electric arc from the movable contact to the second arc extinguishing device. The first stationary contact and the second stationary contact, the movable contact, the first arc running piece and the second arc running piece, the arc guiding piece, the first arc extinguishing device and the second arc extinguishing device are in mirror arrangement with respect to an axis in the first direction. The arc guiding piece, the movable contact and the actuating member are formed to be axisymmetric.

Embodiments of the present disclosure further provide a contactor, which includes the abovementioned breaker.

BRIEF DESCRIPTION OF THE DRAWINGS

In order to more clearly explain the technical solutions of the embodiments of the present disclosure, the following drawings that need to be used in the embodiments will be briefly introduced. It should be understood that the following drawings only show some embodiments of the present disclosure, so they should not be regarded as limiting the scope of protection. For those of ordinary skill in the art, other relevant drawings can be obtained as claimed in these drawings without any creative effort.

DETAILED DESCRIPTION

Figure 1:
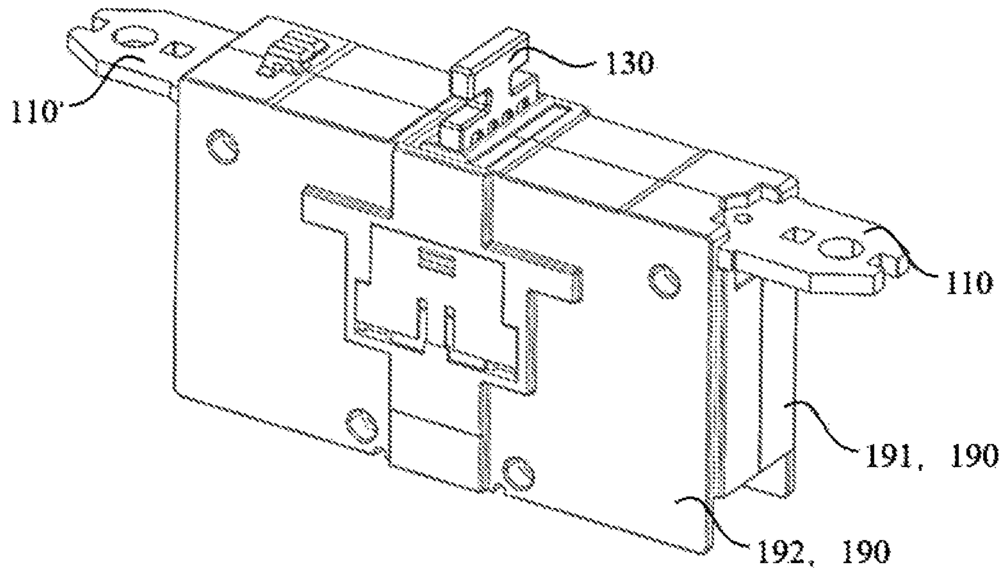
FIG. 1 shows a perspective view of a breaker according to an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, the technical terms or scientific terms used in this disclosure shall have their ordinary meanings as understood by those with ordinary skills in the field to which this disclosure belongs. The words “first”, “second” and the like used in this disclosure do not indicate any order, quantity or importance, but are only used to extinguish different components. Similar words such as “comprising” or “including” refer to that the elements or objects appearing before the word cover the listed elements or objects appearing after the word and their equivalents, without excluding other elements or objects. “up”, “down”, “left”, and “right” are only used to express the relative positional relationship. When the absolute position of the described object changes, the relative positional relationship may also change accordingly.

At least one embodiment of the present disclosure provides a breaker, which includes: a first stationary contact including a first stationary contact portion; a movable contact including a first movable contact portion; an actuating member connected to the movable contact to actuate the movable contact in a first direction to move between an open position and a closed position, at the open position, the first movable contact portion being spaced apart from the first stationary contact portion, at the closed position, the first movable contact portion being in contact with the first stationary contact portion; a first arc extinguishing device includes a plurality of arc extinguishing grid sheets; a first arc running piece extending from a first arc running end portion of the first arc running piece arranged adjacent to the first stationary contact portion through the first arc extinguishing device to a second arc running end portion of the first arc running piece, to guide an electric arc from the first stationary contact to the first arc extinguishing device; an arc guiding piece including a first arc guiding section extending in a first direction, the first arc guiding section being arranged between the movable contact and the first arc extinguishing device in a second direction perpendicular to the first direction, so as to guide an electric arc from the movable contact to the first arc extinguishing device. The second arc running end portion of the first arc running piece and the first arc guiding section are arranged at opposite sides of the first arc extinguishing device in the second direction.

According to the embodiments of the present disclosure, the arc extinguishing performance of the breaker is improved by reasonably configuring the positions, orientations, and the like of various components in the breaker. In addition, the breaker has a compact structure and small occupied volume.

Figure 2:
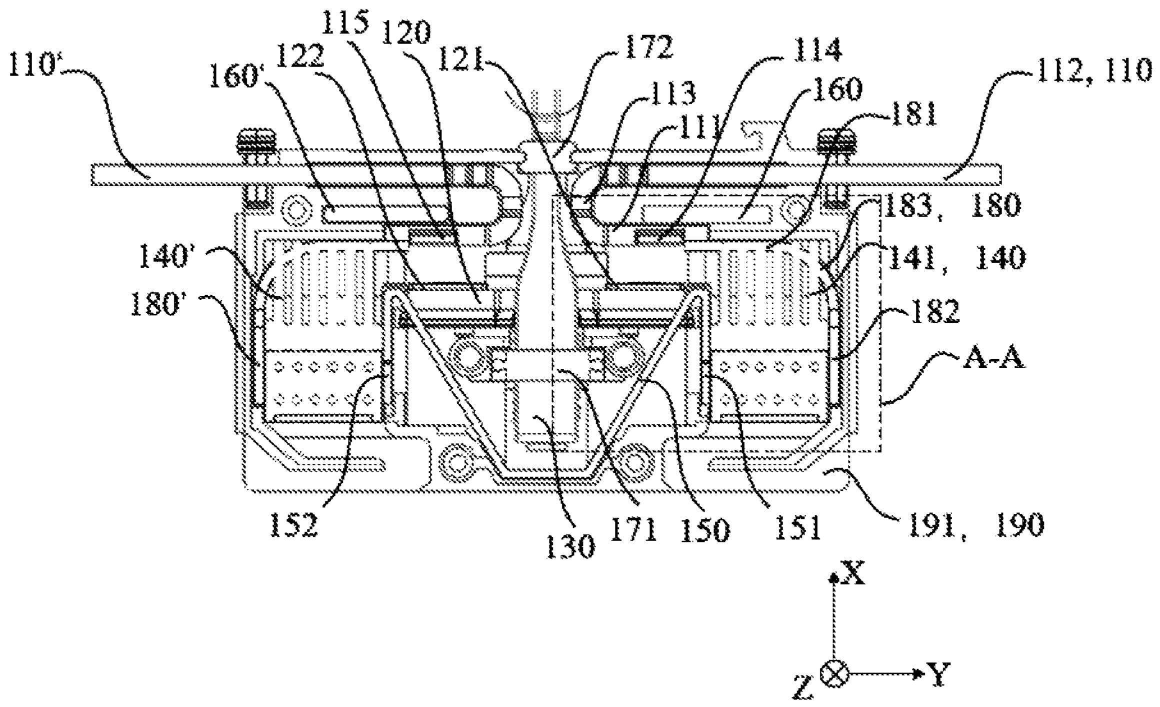
FIG. 2 shows an internal plan view of a breaker according to an embodiment of the present disclosure, in which a second half shell of the breaker is not shown to show the internal configuration of the breaker.

FIG. 1 shows a perspective view of a breaker according to the present disclosure, which shows the appearance of the breaker. FIG. 2 shows an internal plan view of a breaker according to an embodiment of the present disclosure. As illustrated by FIG. 1 and FIG. 2, the breaker includes a housing 190, a contact assembly, an actuating member 130, arc extinguishing devices 140,140', arc running pieces 180, 180', an arc guiding piece 150 and magnetic resistance pieces 160,160'.

Specifically, the housing 190 includes a first half shell 191 and a second half shell 192. The housing 190 is used to accommodate the contact assembly, the actuating member 130, the arc extinguishing devices 140,140', the arc running pieces 180,180', the arc guiding piece 150 and the magnetic resistance pieces 160,160'. FIG. 2 shows a plan view of the interior of the breaker, in which the second half shell 192 is removed to show the interior of the breaker. Referring to FIG. 2, a first direction X (up-down direction in the figure), a second direction Y (left-right direction in the figure) and a third direction Z (direction perpendicular to the paper surface in the figure) can be defined, and they are perpendicular to each other.

In an example, the contact assembly includes one first stationary contact 110, one second stationary contact 110' and one movable contact 120. The first stationary contact 110 includes a first stationary contact portion 114 (or a first stationary contact point), the second stationary contact 110' includes a second stationary contact portion 115 (or a second stationary contact point), and the movable contact 120 includes a first movable contact portion 121 (or a first movable contact point) corresponding to the first stationary contact portion 114 and a second movable contact portion 122 (or a second movable contact point) corresponding to the second stationary contact portion 115. For example, the first stationary contact portion 114, the second stationary contact portion 115, the first movable contact portion 121 and the second movable contact portion 122 are all flat surfaces, but the present disclosure is not limited thereto. The first stationary contact portion 114 and the first movable contact portion 121 constitute a first group of contact portions, and the second stationary contact portion 115 and the second movable contact portion 122 constitute a second group of contact portions. For example, the first stationary contact portion 114 and the first movable contact portion 121 face each other in the first direction X, and the second stationary contact portion 115 and the second movable contact portion 122 face each other in the first direction X.

The first stationary contact 110 and the second stationary contact 110' are J-shaped, which generally extend in the second direction Y, and a part of each of the first stationary contact 110 and the second stationary contact 110' oppositely extends out of the housing 190 in the second direction Y, thereby allowing an external circuit to be electrically connected to the two stationary contacts 110,110'.

The movable contact 120 extends in the second direction Y, and the first movable contact portion 121 and the second movable contact portion 122 are located at both ends of the movable contact 120. For example, the movable contact 120 may include a movable contact body and an iron cap.

The actuating member 130 passes through an opening in the middle of the movable contact 120 and is fixedly connected to the movable contact 120, and the actuating member 130 moves in the first direction X to actuate the movable contact 120 to move between an open position (referring to FIG. 2, for example) and a closed position in the first direction X. A part of the actuating member 130 extends upward out of the housing 190 in the first direction X.

The breaker also includes guide members 171,172, which include a first guide member 171 and a second guide member 172, which are spaced apart by a distance in the first direction X. The second guide member 172 is disposed at an opening of the housing 190, and the actuating member 130 extends out of the housing 190 through the opening. The first guide member 171 is disposed below the movable contact 120. The movable contact 120 is positioned between the first guide member 171 and the second guide member 172.

Upon the movable contact 120 being at the closed position, the first movable contact portion 121 of the movable contact 120 is in contact with the first stationary contact portion 114 of the first stationary contact 110 to form electric connection, and the second movable contact portion 122 of the movable contact 120 is in contact with the second stationary contact portion 122 of the second stationary contact 110' to form electric connection, so as to turn-on a current path from the first stationary contact 110 to the second stationary contact 110' through the movable contact 120. Upon the movable contact 120 being at the open position, the first movable contact portion 121 of the movable contact 120 is spaced apart from the first stationary contact portion 114 of the first stationary contact 110 for insulation, and the second movable contact portion 122 of the movable contact 120 is spaced apart from the second stationary contact portion 115 of the second stationary contact 110' for insulation. The current path from the first stationary contact 110 to the second stationary contact 110' through the movable contact 120 is turned-off.

Upon the movable contact 120 moving from the closed position to the open position, an electric arc may be generated between the first movable contact portion 121 and the first stationary contact portion 114 and the second movable contact portion 122 and the second stationary contact portion 115. Therefore, it is needed to provide a device for guiding and extinguishing the electric arc to guide the generated electric arc away from the stationary contacts 110,110' and the movable contacts 120 and extinguish the electric arc, so as to prevent the ablation and potential safety hazard of components such as the stationary contacts 110, 110' and the movable contacts 120.

In the present embodiment, the arc extinguishing devices 140,140', the arc guiding piece 150 and the arc running pieces 180,180' are provided to guide and extinguish the electric arc. Through the reasonable setting of each component (e.g., position, size, shape, etc.), the breaker becomes compact, for example, fully occupies the space volume, and the arc extinguishing performance is improved, for example, the arc dead time is reduced, the arc blowing performance is improved and the arc zero crossing times is reduced.

In an example, the arc extinguishing devices 140,140' include a first arc extinguishing device 140 and a second arc extinguishing device 140', which are respectively used for the above-mentioned first group of contact portions and second group of contact portions. The arc running pieces 180,180' include a first arc running piece 180 and a second arc running piece 180', which are respectively used for the above-mentioned first group of contact portions and second group of contact portions. The magnetic resistance pieces 160,160' include a first magnetic resistance piece 160 and a second magnetic resistance piece 160', which are respectively used for the abovementioned first group of contact portions and second group of contact portions. The actuating member 130 and the arc guiding piece 150 are commonly used by the above-mentioned first group of contact portions and second group of contact portions.

In an example, the first stationary contact 110 and the second stationary contact 110', the movable contact 120, the first arc running piece 180 and the second arc running pieces 180', the arc guiding piece 150, the first arc extinguishing device 140 and the second arc extinguishing device 140', and the first magnetic resistance piece 160 and the second magnetic resistance pieces 160' are in mirror arrangement with respect to the axis in the first direction X. Furthermore, the arc guiding piece 150, the movable contact 120 and the actuating member 130 are formed to be axisymmetric, but the present disclosure is not limited thereto.

However, the present disclosure is not limited to the symmetrical arrangement, and other arrangement forms may be adopted. For example, in an example, the contact assembly only includes one stationary contact (e.g., the first stationary contact 110) and one movable contact 120, and a current path is turned-on and turned-off through the contact and separation between the movable contact 120 and the stationary contact 110. The movable contact 120 extends out of the housing 190 to electrically connect with one end of an external circuit, and the stationary contact 110 extends out of the housing 190 to electrically connect with the other end of the external circuit.

Hereinafter, the case where the breaker has a symmetrical form is taken as an example to describe the breaker according to the present disclosure.

For example, the first stationary contact 110 and the second stationary contact 110' may be approximately the same, the first arc running piece 180 and the second arc running piece 180' may be approximately the same, and the first arc extinguishing device 140 and the second arc extinguishing device 140' may be approximately the same. Therefore, only the first stationary contact 110, the first arc running piece 180, the first arc extinguishing device 140 and the first magnetic resistance piece 160 will be described in detail below, and the descriptions of the first stationary contact 110, the first arc running piece 180, the first arc running piece 140 and the first magnetic resistance piece 160 can also be applied to the second stationary contact 110', the second arc running piece 180' and the second arc extinguishing device 140, respectively.

As illustrated by FIG. 2, the first arc extinguishing device 140 includes a plurality of arc extinguishing grid sheets 141. In this example, the first arc extinguishing device 140 includes six arc extinguishing grid sheets 141, which may be other numbers, such as less than five or more than seven. The arc extinguishing grid sheets 141 are spaced apart from each other in the second direction Y, and extend in sheet shapes in the first direction X and the third direction Z. Due to the orientation of the first arc extinguishing device 140, the volume of the breaker is reduced and the arrangement of various components of the breaker is more compact.

Similarly, the second arc extinguishing device 140' includes a plurality of arc extinguishing grid sheets arranged spaced apart from each other in the second direction Y.

The first arc running piece 180 is used to guide the electric arc from the first stationary contact 110 to the first arc extinguishing device 140. For example, the first arc running piece 180 has a rounded L-shape, and includes a first arm portion 181 having a first arc running end portion extending in the second direction Y, a second arm portion 182 having a second arc running end portion extending in the first direction X, and a curved connecting portion 183 connecting the first arm portion and the second arm portion.

The first arc running end portion is disposed adjacent to the first stationary contact 110. For example, the first arc running end portion is welded to a free end of the first stationary contact 110 close to the first stationary contact portion 114. Therefore, the arc guiding performance of the arc running piece can be enhanced.

The first arc running piece 180 extends rightward and downward from the first arc running end portion in the first direction X and the second direction Y through the first arc extinguishing device 140 to the second arc running end portion. Because the first arc running piece 180 passes through the first arc extinguishing device 140, the first arc running piece 180 can guide the electric arc into the first arc extinguishing device 140 more quickly and effectively, thus improving the arc extinguishing performance of the breaker. In the second direction Y, the first arc running end portion is located on the first side (i.e., inside) of the first arc extinguishing device 140, and the second arc running end portion is located on the second side (i.e., outside) of the first arc extinguishing device 140, which is opposite to the first side.

For example, a notch is provided in the arc extinguishing grid sheet 141 of the first arc extinguishing device 140. The first arm portion 181 and the curved connecting portion 183 pass through the notches of the plurality of arc extinguishing grid sheets 141 of the first arc extinguishing device 140, so that a projection of the first arc-running grid 180 on the third direction Z at least partially overlaps with projections of the plurality of arc extinguishing grid sheets 141 in the third direction Z.

Similarly, the second arc running piece 180' is used to guide the electric arc from the second stationary contact 110' to the second arc extinguishing device 140', and includes a third arc running end portion and a fourth arc running end portion. The third arc running end portion is disposed adjacent to the second stationary contact 110'. The second arc running piece 180' extends leftwards and downwards from the third arc running end portion in the first direction X and the second direction Y through the second arc extinguishing device 140' to the fourth arc running end portion. In the second direction Y, the third arc running end portion is located on the third side (i.e., inside) of the second arc extinguishing device 140', and the fourth arc running end portion is located on the fourth side (i.e., outside) of the second arc extinguishing device 140', which is opposite to the third side. The second arc running piece 180' passes through the plurality of arc extinguishing grid sheets 141 of the second arc extinguishing device 140', so that a projection of the second arc running piece 180' on the third direction Z at least partially overlaps with projections of the plurality of arc extinguishing grid sheets 141 on the third direction Z. Therefore, the arc extinguishing performance of the breaker is improved.

The arc guiding piece 150 is approximately M-shaped, and includes a first arc guiding section 151 and a second arc guiding section 152 both extending in the first direction X. The first arc guiding section 151 is arranged between the movable contact 120 and the first arc extinguishing device 140 in the second direction Y to guide the electric arc from the movable contact 120 to the first arc extinguishing device 140. The second arc guiding section 152 is arranged between the movable contact 120 and the second arc extinguishing device 140' in the second direction Y to guide the electric arc from the movable contact 120 to the second arc extinguishing device 140'. An opening is provided in the arc guiding piece 150, so that the movable contact 120 passes through the opening and moves. For example, the arc guiding piece 150 is an integral piece.

The first stationary contact 110 includes a first parallel section 111, a second parallel section 112, and a contact curved section 113 connecting the first parallel section 111 and the second parallel section 112. The first parallel section 111 extends in the second direction Y within the housing 190, and the second parallel section 112 extends out of the housing 190 in the second direction Y. The first stationary contact portion 114 is disposed on the first parallel section 111 of the first stationary contact 110.

Similarly, the second stationary contact 110' includes another first parallel section, another second parallel section, and another contact curved section connecting the first parallel section and the second parallel section. The second stationary contact portion 115 is disposed on the first parallel section of the second stationary contact 110'.

The first magnetic resistance piece 160 is positioned between the first parallel section 111 and the second parallel section 112 of the first stationary contact 110 in the first direction X. The first magnetic resistance piece 160 extends parallel to the first parallel section 111 of the first stationary contact 110.

Similarly, the second magnetic resistance piece 160' is positioned between the first parallel section and the second parallel section of the second stationary contact 110' in the second direction Y. The second magnetic resistance piece 160' extends parallel to the first parallel section of the second stationary contact 110'.

The positions of the various components are properly set, to obtain good arc extinguishing performance.

Figure 3:
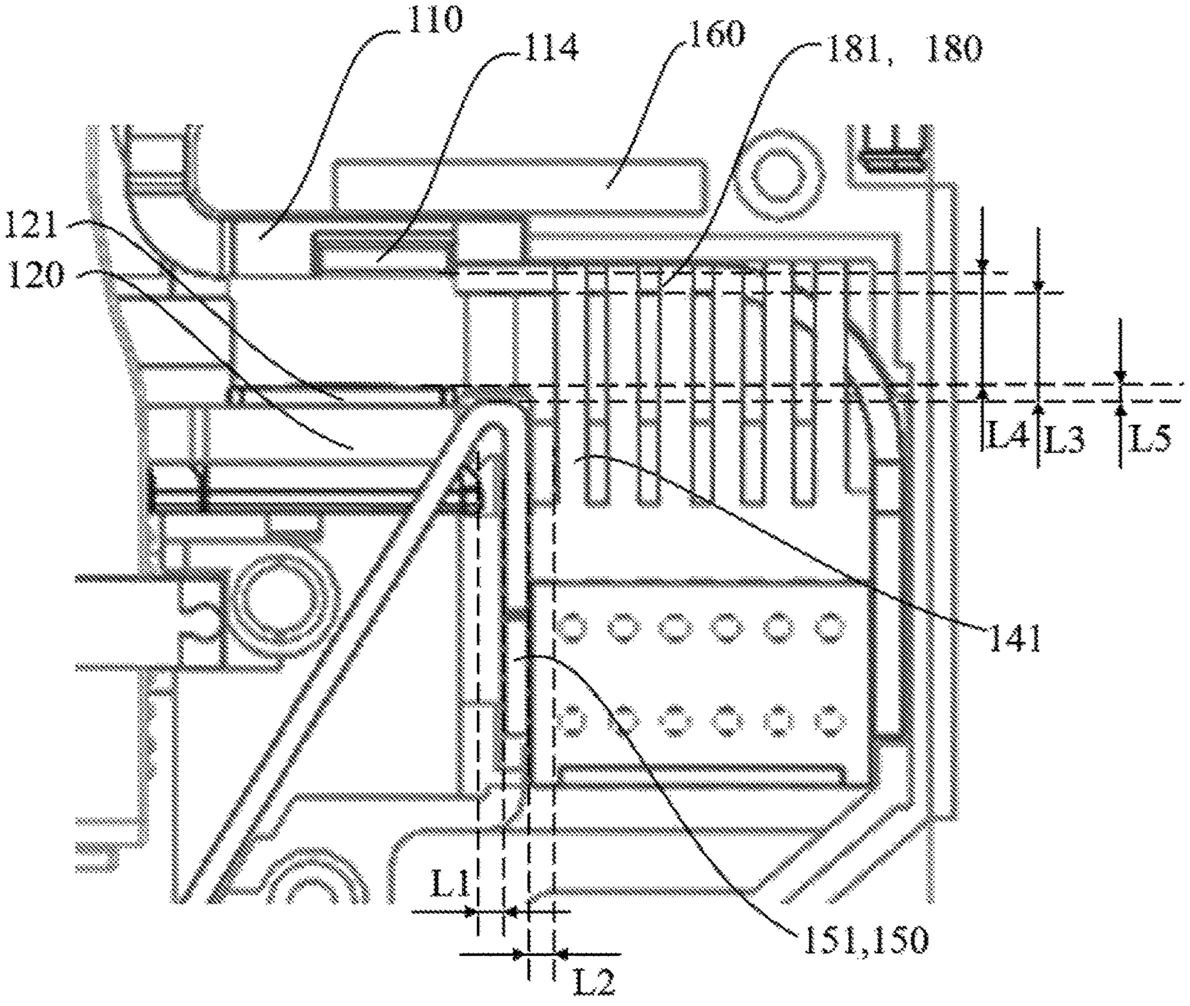
FIG. 3 shows an enlarged view of a part of the dotted line box A-A in FIG. 2.
Figure 4:
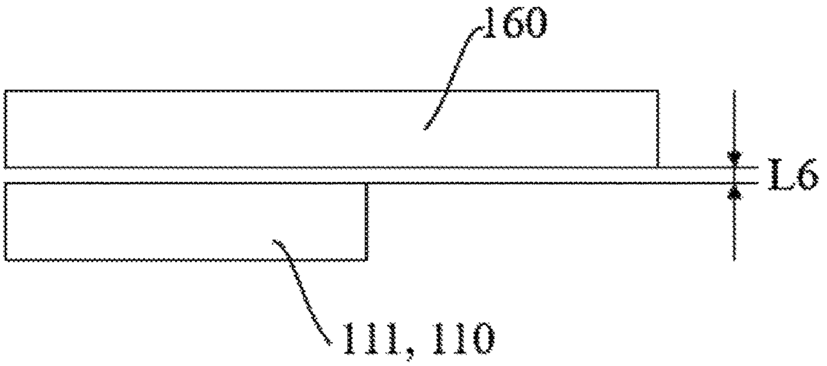
FIG. 4 shows an enlarged view at a first magnetic resistance piece and a first parallel section of a first stationary contact in FIG. 2.

FIG. 3 shows an enlarged view of a part of the dotted line box A-A in FIG. 2, and FIG. 4 shows an enlarged view of the first magnetic resistance piece 160 and the first parallel section 111 of the first stationary contact 110 in FIG. 2.

Referring to FIG. 3, for example, in the second direction Y, the shortest distance L1 between the movable contact 120 and the first arc guiding section 151 is approximately equal to the shortest distance L2 between the first arc guiding section 151 and the arc extinguishing grid sheet 141.

For example, the first movable contact portion 121, the first stationary contact portion 114, the second movable contact portion 120 and the second stationary contact portion 110' are all flat surfaces. The distance L3 between the first arc running piece 180 and the arc guiding piece 150 in the first direction X is the shortest. In the first direction X, the distance L3 between the first arc running piece 180 and the arc guiding piece 150 is approximately equal to the distance L4 between the first movable contact portion 121 and the first stationary contact portion 114 upon the movable contact 120 being at the open position.

For example, upon the movable contact 120 being at the open position, the first movable contact portion 121 is closer to the first stationary contact 110 than the arc guiding piece 150 in the first direction X, and the shortest distance L5 between the first movable contact portion 121 and the arc guiding piece 150 at the open position is approximately equal to the shortest distance L1 in the second direction Y between the movable contact 120 and the first arc guiding piece 151.

Here, "approximately" refers to that the distances between the two pairs of components are equal to each other, but a small error is allowed, so that the two pairs of components have balanced arc guiding performance.

Referring to FIG. 4, for example, the distance L6 between the first magnetic resistance piece 160 and the first parallel section 111 of the first stationary contact 110 in the first direction X is less than 0.5 mm.

An embodiment according to the present disclosure further provides a contactor, which includes a breaker, such as a plurality of breakers. For example, the breaker is the abovementioned breaker.

The scope of the present disclosure is not limited by the above-described embodiments, but by the appended claims and their equivalents.

The invention claimed is:

1. A breaker comprising:

a first stationary contact, comprising a first stationary contact portion;

a movable contact, comprising a first movable contact portion;

an actuating member, connected to the movable contact to actuate the movable contact to move in a first direction between an open position and a closed position, at the open position, the first movable contact portion being spaced apart from the first stationary contact portion, at the closed portion, the first movable contact portion being in contact with the first stationary contact portion;

a first arc extinguishing device, comprising a plurality of arc extinguishing grid sheets;

a first arc running piece, extending from a first arc running end portion of the first arc running piece arranged adjacent to the first stationary contact portion to a second arc running end portion of the first arc running piece through the first arc extinguishing device, to guide an electric arc from the first stationary contact to the first arc extinguishing device; and an arc guiding piece comprising a first arc guiding section extending in the first direction, the first arc guiding section being arranged between the movable contact and the first arc extinguishing device in a second direction perpendicular to the first direction, to guide an electric arc from the movable contact to the first arc extinguishing device, wherein the second arc running end portion of the first arc running piece and the first arc guiding section are arranged at opposite sides of the first arc extinguishing device in the second direction, wherein in the second direction, a shortest distance between the movable contact and the first arc guiding section is approximately equal to a shortest distance between the first arc guiding section and the arc extinguishing grid sheets, wherein the first movable contact portion is a flat surface; upon the movable contact being at the open position, the first movable contact portion is closer to the first stationary contact than the arc guiding piece in the first direction, and upon the movable contact being at the open position, a shortest distance between the first movable contact portion and the arc guiding piece in the first direction is approximately equal to a shortest distance between the movable contact and the first arc guiding section in the second direction.

2. The breaker according to claim 1, further comprising:

a housing, completely accommodating the movable contact, the first arc extinguishing device, the first arc running piece and the arc guiding piece, and accommodating at least a part of the actuating member and the first stationary contact, wherein the actuating member extends to an outside of the housing in the first direction, and the first stationary contact extends to the outside of the housing in the second direction.

3. The breaker according to claim 2, wherein the first stationary contact comprises a first parallel section, a second parallel section, and a contact curved section connecting the first parallel section and the second parallel section, the first parallel section extends in the housing in the second direction, and the second parallel section extends out of the housing in the second direction, the first stationary contact portion is arranged on the first parallel section of the first stationary contact.

4. The breaker according to claim 3, further comprising:

a first magnetic resistance piece, wherein the first magnetic resistance piece is positioned between the first parallel section and the second parallel section of the first stationary contact in the first direction, and the first magnetic resistance piece extends in the second direction and is spaced apart from the first parallel section by a distance of less than 0.5 mm in the first direction.

5. The breaker according to claim 1, wherein the plurality of arc extinguishing grid sheets are spaced apart in the second direction, and extend into sheets in the first direction and a third direction, the third direction is perpendicular to the first direction and the second direction, each of the arc extinguishing grid sheets is provided with a notch, the first arc running piece extends from the first arc running end portion to the second arc running end portion and extends away from the first stationary contact portion in both the first direction and the second direction, and the first arc running piece extends through notches of the plurality of arc extinguishing grid sheets.

6. The breaker according to claim 1, wherein the first arc running piece is rounded L-shaped.

7. The breaker according to claim 1, wherein the first arc running end portion is welded to a free end of the first stationary contact close to the first stationary contact portion.

8. The breaker according to claim 1, wherein the first movable contact portion and the first stationary contact portion are both flat surfaces, and a distance between the first arc running piece and the arc guiding piece is the shortest in the first direction; in the first direction, the distance between the first arc running piece and the arc guiding piece is approximately equal to a distance between the first movable contact portion and the first stationary contact portion upon the movable contact being at the open position.

9. The breaker according to claim 1, further comprising:

a second stationary contact, comprising a second stationary contact portion;

a second arc extinguishing device; and a second arc running piece configured to guide an electric arc from the second stationary contact to the second arc extinguishing device, wherein the movable contact further comprises a second movable contact portion, at the open position, the second movable contact portion being spaced apart from the second stationary contact portion, and at the closed position, the second movable contact portion being in contact with the second stationary contact portion contact, the arc guiding piece further comprises a second arc guiding section extending in the first direction, the second arc guiding section is configured to guide an electric arc from the movable contact to the second arc extinguishing device, the first stationary contact and the second stationary contact, the movable contact, the first arc running piece and the second arc running piece, the arc guiding piece, the first arc extinguishing device and the second arc extinguishing device are in mirror arrangement with respect to an axis in the first direction, the arc guiding piece, the movable contact and the actuating member are formed to be axisymmetric.

10. A contactor comprising:

a breaker comprising:

a first stationary contact, comprising a first stationary contact portion;

a movable contact, comprising a first movable contact portion;

an actuating member, connected to the movable contact to actuate the movable contact to move in a first direction between an open position and a closed position, at the open position, the first movable contact portion being spaced apart from the first stationary contact portion, at the closed portion, the first movable contact portion being in contact with the first stationary contact portion;

a first arc extinguishing device, comprising a plurality of arc extinguishing grid sheets;

a first arc running piece, extending from a first arc running end portion of the first arc running piece arranged adjacent to the first stationary contact portion to a second arc running end portion of the first arc running piece through the first arc extinguishing device, to guide an electric arc from the first stationary contact to the first arc extinguishing device; and an arc guiding piece comprising a first arc guiding section extending in the first direction, the first arc guiding section being arranged between the movable contact and the first arc extinguishing device in a second direction perpendicular to the first direction, to guide an electric arc from the movable contact to the first arc extinguishing device, wherein the second arc running end portion of the first arc running piece and the first arc guiding section are arranged at opposite sides of the first arc extinguishing device in the second direction, wherein in the second direction, a shortest distance between the movable contact and the first arc guiding section is approximately equal to a shortest distance between the first arc guiding section and the arc extinguishing grid sheets, wherein the first movable contact portion is a flat surface; upon the movable contact being at the open position, the first movable contact portion is closer to the first stationary contact than the arc guiding piece in the first direction, and upon the movable contact being at the open position, a shortest distance between the first movable contact portion and the arc guiding piece in the first direction is approximately equal to a shortest distance between the movable contact and the first arc guiding section in the second direction.

11. The breaker according to claim 10, wherein the breaker further comprises:

a housing, completely accommodating the movable contact, the first arc extinguishing device, the first arc running piece and the arc guiding piece, and accommodating at least a part of the actuating member and the first stationary contact, wherein the actuating member extends to an outside of the housing in the first direction, and the first stationary contact extends to the outside of the housing in the second direction.

12. The breaker according to claim 11, wherein the first stationary contact comprises a first parallel section, a second parallel section, and a contact curved section connecting the first parallel section and the second parallel section, the first parallel section extends in the housing in the second direction, and the second parallel section extends out of the housing in the second direction, the first stationary contact portion is arranged on the first parallel section of the first stationary contact.

13. The breaker according to claim 10, wherein the plurality of arc extinguishing grid sheets are spaced apart in the second direction, and extend into sheets in the first direction and a third direction, the third direction is perpendicular to the first direction and the second direction, each of the arc extinguishing grid sheets is provided with a notch, the first arc running piece extends from the first arc running end portion to the second arc running end portion and extends away from the first stationary contact portion in both the first direction and the second direction, and the first arc running piece extends through notches of the plurality of arc extinguishing grid sheets.

14. The breaker according to claim 10, wherein the first arc running piece is rounded L-shaped.

15. The breaker according to claim 10, wherein the first arc running end portion is welded to a free end of the first stationary contact close to the first stationary contact portion.

16. The breaker according to claim 10, wherein the first movable contact portion and the first stationary contact portion are both flat surfaces, and a distance between the first arc running piece and the arc guiding piece is the shortest in the first direction; in the first direction, the distance between the first arc running piece and the arc guiding piece is approximately equal to a distance between the first movable contact portion and the first stationary contact portion upon the movable contact being at the open position.

* * * * *